United States Patent
Chih

Patent Number: 6,113,005
Date of Patent: Sep. 5, 2000

[54] WATER PIPELINE FOREIGN MATTER OBSTRUCTION REMOVER

[76] Inventor: Ti-An Chih, No.5, Tyan Yang Lane, Jaw An Li, Luh Kang Chen, Chang Hua Hsien, Taiwan

[21] Appl. No.: 09/305,667

[22] Filed: May 5, 1999

[51] Int. Cl.[7] .............................. B05B 3/06; B08B 1/00; B08B 3/00
[52] U.S. Cl. .................. 239/251; 134/167 C; 15/104.12
[58] Field of Search ..................................... 239/104, 123, 239/237, 251, 239, 255, 256, DIG. 13; 15/104.061, 104.13, 104.12, 104.15, 104.16, 104.09; 134/167 C, 168 C

[56] References Cited

U.S. PATENT DOCUMENTS

| | | | |
|---|---|---|---|
| 793,204 | 6/1905 | Lemke | 15/104.12 |
| 4,164,325 | 8/1979 | Watson | 239/DIG. 13 |
| 5,439,175 | 8/1995 | Katayama | 239/251 |
| 5,745,948 | 5/1998 | Lloyd et al. | 15/104.12 |

*Primary Examiner*—Andres Kashnikow
*Assistant Examiner*—Davis Hwu
*Attorney, Agent, or Firm*—Dougherty & Troxell

[57] ABSTRACT

A water pipeline foreign matter obstruction remover having an interior space, the water output hole of a water output head at the center of the top end, a water hose connector at the bottom section, and a connector seat that conjoins the top section with the water output head. A number of water output openings are situated along the approximate middle section of the water output head and contained within the area between the water output head and the connector seat is a water output nozzle and a water output seat having a rotary water output head. A water output passage is situated along the interior of the water output nozzle, with the nozzle discharging from the center of the top section. Rotary cleaner arms are positioned at the top section, with a water output passage situated at the middle section. The water output seat has two semicircular seat halves, one of the semicircular seat halves is aligned with the water output passage situated at the middle section of the water output nozzle, enabling the placement of the water output hole along the tangent of the insertion fastening edge in the interior section in the direction, the assembly fitting within a pipeline for removal of foreign matter.

3 Claims, 6 Drawing Sheets

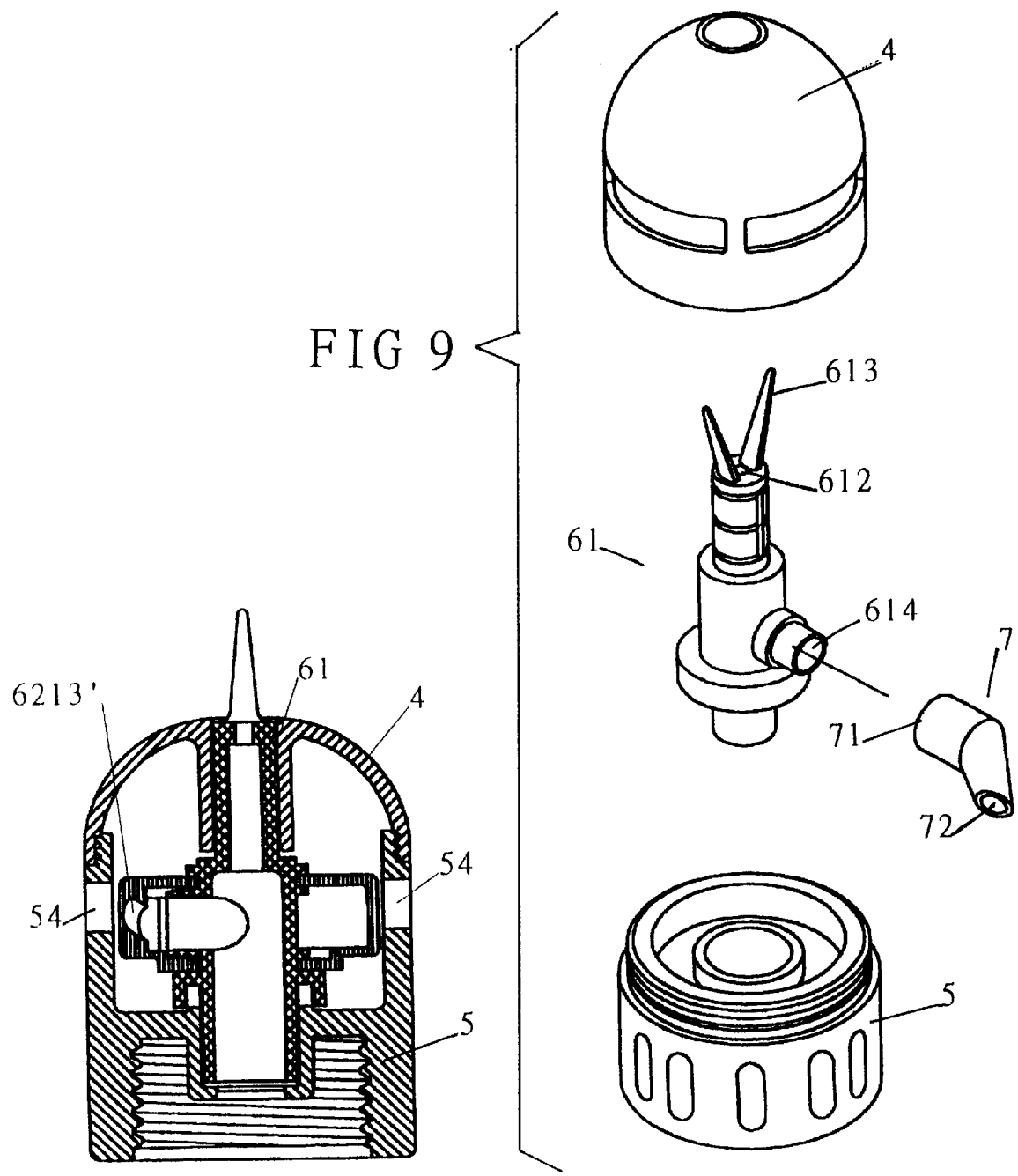

WATER PIPELINE FOREIGN MATTER OBSTRUCTION REMOVER

BACKGROUND OF THE INVENTION

1. Field of the Invention

The invention herein relates to a water pipeline foreign matter obstruction remover of improved design that removes foreign matter obstructing water pipeline drainage systems which cannot be dislodged by conventional water pipeline obstruction removers due to their structural shortcomings. In the structure of the invention herein, the removal device is capable of utilizing vibrational force as well as water pressure to achieve the optimal removal of foreign matter obstructions, which is among the original innovations of the invention herein.

2. Description of the Prior Art

Most household drainage pipelines are subjected to evacuating tea leaves, hair, vegetable remains as well as skin tissue residues from washing or bathing, and other matter. To counteract the dropping of foreign matter into the drainage pipeline in kitchens, for example, a filtering screen is placed over the drain opening to prevent the entry of larger vegetable remains, while still allowing smaller matter to enter the drainage pipeline. Since such miscellaneous foreign matter often consists of the oily or greasy substances that cling to the walls of the pipeline, an accumulation builds up over a period of days and months. If not cleaned at regular intervals, the entire drainage pipeline eventually becomes seriously clogged.

Therefore, as indicated in FIG. 1, the conventional water pipeline foreign matter obstruction remover A currently available on the market designed to dislodge the said foreign matter is comprised of a hollow interior that contains an output line opening A11, with the output line opening A11 fastened to the appliance A1 with the turnable securing bolt A12, and the agitator line A2, consisting of screw-profiled metal material of appropriate length having a relative large agitator section A21 at the front end. The agitator line A2 is typically stored inside the appliance A1, with the forward section of the agitator line A2 fastened in place by the turnable securing bolt A12. When utilized, the securing bolt 12 is loosened and then agitator line A2 is pulled out and extended into the pipeline to remove the foreign matter accumulated therein. However, since the water pipeline of often constructed of a plastic material, the said metal screw-profiled agitator line A2 easily damages the pipeline, which is a shortcoming requiring improvement.

Furthermore, as indicated in FIG. 2, the design of the water pipeline foreign matter obstruction remover currently available on the market has been modified to utilize the force of flowing water to powerfully purge the interior of the water pipe to dislodge the foreign matter from the walls and is comprised of a hemispherical front section having a hollow interior section 21, with a relative small diameter water jet hole 22 at the center of the front end as well as a number of small diameter water jet holes 23 arrayed around the hemispherical area, a threaded section 24 is situated along the bottom section of the water output head 2, a water passage 31 through the center, and the threaded section 24 along the bottom end of the water output head 2 is conjoined to a connector seat 3; after the connector seat 3 of the foreign matter remover appliance is connected to the water hose connector S and water flows through the water hose connector S from the water hose S1, the said structural constituents allows the user to insert the water hose S1 of the foreign matter remover appliance into water pipeline to remove the foreign matter therein, and after the flow of water utilized enters the water output head 2 inside the foreign matter remover appliance, due to the small diameter design of the water jet hole 22 at the front end of the water output head 2 and the water jet holes 23 at the center section of the water output head 2 and, furthermore, the situation manifested in the hollow interior section of the water output head 21 in which flowing water is emitted as fine columns of water through the said water jet holes 22 and 23 that impact the water pipeline walls S2 to effectively remove the foreign matter S3 clinging to the water pipeline walls S2.

The said conventional foreign matter remover appliance utilizes the momentum of the flowing water to impact the water pipeline walls S2 and when the said appliance connected water hose S1 is inserted to remove the foreign matter in the water pipeline, the entire front end said water output head 2 and the water jet holes 22 and 23 along the center section emit fine columns of flowing water that impact the water pipeline walls S2 are situated at the front end and center section of the water output head 2, however, the water jet hole 23 at the center section of the water output head 2 are equally distributed along the center section of the hemispherical area, such that when water flows into the hollow space of the water output head 2 to be emitted from the said water jet holes 23 and the water flow enters the water pipeline S2 through the interior section 21 of the foreign matter remover appliance, since the water flow is incapable of building up pressure inside the hollow interior section 21 of the foreign matter remover appliance, the momentum of the fine columns of water emitted from the water jet holes 22 and 23 at the front section and the center section of the foreign matter remover appliance cannot achieve a powerful water flow and, furthermore, affects the objective of the entire structure to utilize forceful momentum to the effectively remove the foreign matter as illustrated, which requires improvement; furthermore, when the user inserts the entire front end to bring the water hose S1 of the foreign matter remover appliance in contact to remove the foreign matter within the water pipeline and after the water flow is initiated, the said contact at the front end of the foreign matter remover appliance is incapable of being inserted along the interior of the entire water pipeline and, even with the water jet hole 22 at the front end of the water output head 2 and the water jet holes 23 at the center hemispherical section of the water output head 2, and the water output head 2 surface makes direct external contact with the foreign matter S3 clinging the pipeline walls, the water output head 2 of the foreign matter remover appliance becomes lodged against a side of the water pipeline walls S2, at which time the foreign matter S3 readily fill the water jet holes 23 at the center hemispherical section of the water jet head 2 and obstructs them, preventing water flow through the said water holes 23 and affects the foreign matter removal performance of the foreign matter remover appliance, which also requires improvement.

Therefore, in view of the said shortcomings of the said conventional structures, the inventor of the invention herein, based on professional engagement acquired through engagement in the field of plumbing hardware manufacturing and many years of first hand experience with the associated inconveniences, conducted extensive research to improve the conventional structure which finally culminated in the present invention and, furthermore, since the invention herein was subjected to numerous testing to verify that the invention herein possessed performance that was superior to the said structures, the invention herein was submitted in application for patent rights.

SUMMARY OF THE INVENTION

The primary objective of the invention herein is to provide a water pipeline obstruction remover comprised of an interior space, the water output hole of a water output head at the center of the top end, a water hose connector at the bottom section, and a connector seat that conjoins the top section with the water output head, the innovations of which are: a number of water output openings are situated along the approximate middle section of the water output head and contained within the area between the water output head and the connector seat is a water output nozzle and a water output seat comprising a rotary water output head; a water output passage is situated along the interior of the water output nozzle, with the nozzle discharging from the center of the top section; rotary cleaner arms are positioned at the top section, with a water output passage situated at the middle section and, furthermore, there is a protruding edge at the upper and lower edges of the water output passage; the water output seat consists of two semicircular seat halves and, furthermore, are insertion fastened to the water output nozzle by means of a protruding edge situated on the top and bottom extend of the middle section of the water output nozzle, of which one of the semicircular seat halves is aligned with the water output passage situated at the middle section of the water output nozzle with the insertion fastening edge facing inward, enabling the placement of the water output hole along the tangent of the insertion fastening edge in the interior section in the direction the outer circumference of the semicircular seat half and, furthermore, enabling the water output hole to be aligned with the water output openings along the middle section of the water output head, with the said structural constituents to providing for the union of the entire structure with the pipeline for the elimination of foreign matter inside the pipeline and thereby achieve effective removal performance.

Another objective of the invention herein is to provide a water pipeline obstruction remover that provides a spraying rotary water output head that utilizes the powerful force of flowing water and since it is contained in the interior space between the water output head and the connector seat, it is supplied with powerful flowing water from the water output nozzle of the rotary water output head at the front end and center, the water output passage situated at the middle section, and the semicircular seat halves and, furthermore, after the flow of water is directed tangentially through the water output hole, the water is conveyed through the front center section of the water output head and water output openings around the center section such that the water is discharged from all the water output holes of the rotary water output head, and when the water output head of the foreign matter remover is inserted into and brought into union with the water pipeline to remove the foreign matter clinging to the pipeline walls, the said water output holes of the rotary water output head are not clogged because they are not situated directly on the top of the water output head as in the case with the conventional structures, but are laterally situated on the water output head of the foreign matter remover facing the pipeline walls, which provides for a separation interval which ensures that water is discharged to effectively remove the foreign matter from the pipeline walls.

Yet another objective of the invention herein is to provide a water pipeline foreign matter obstruction remover, wherein the rotary water head is contained in the space between the water output head and the connector seat, with a water output passage in the middle section of the water output nozzle, and the original water output seat can be modified so that the bottom end of the water tube can be inserted onto and connected to the said water output passage and thereby direct the tangential flow of water out through the water output hole along the top and bottom inside the water output head and, furthermore, provide a flow of water to the water output passage in the rotary water output head of the obstruction remover that passes through the water output passage along the middle section, such that when the water is finally discharged through the water tube; and in addition to discharging through the water output hole of the water output seat at an increased pressure because it is of a smaller diameter than the water output passage inside the rotary water head, due to the design of the directional tangent along the inside of the semicircular seat half of the water output seat, as the entire water flow is discharged through the water output hole of the water output seat, in addition to passing through the water output hole of the water output seat which are of a smaller diameter than the water output passage inside the rotary water output head and thereby causing the intensification of water flow pressure at the said area, due to the design of the directional tangent along the inside of the semicircular seat half of the water output seat, when the overall water flow is discharged through the water output hole of the water output seat, since the water output hole is smaller in diameter than the water output passage in the middle section of the rotary water output head, a powerful liquid pressure is generated to power the rotation of the rotary water output head and, furthermore, causes the water flowing through the said water output hole to discharge tangentially in a forceful swirl and spray out through water output openings along the middle section of the water output head; furthermore, when the water flow is forcefully discharged tangentially through the water output openings around the middle section of the water output head and the flowing water impacts the ribs between each of the water output openings, the instantaneous momentum produced causes a rotational force to be generated inside the rotary water output head of the obstruction remover, with the said instantaneous momentum also producing a vibrational force, which are finally combined to spin and bring into guidance operation the rotary cleaner arms at the tip of the front section of the rotary water output head 6, which causes the break up of the foreign matter on the water pipe walls and thereby effectively increases removal performance, which is among the original innovations of the invention herein.

A further objective of the invention herein is to provide a water pipeline foreign matter obstruction remover, wherein the original water output openings situated along the approximate middle section of the water output head can be modified, whereby a number of water output openings are situated along the top section of the connector seat and similarly, the space between the water output head and the connector seat can contain a water output nozzle and a water output seat comprising the rotary water output head to similarly achieve the union of the entire structure with the water pipeline to provide effective removal performance when foreign matter is to be eliminated from the inside of the pipeline.

To enable a further understanding of the structural features, operation, and other aspects of the invention herein, the brief description of the drawings below are followed by the detailed description of the preferred embodiments of the invention herein.

BRIEF DESCRIPTION OF THE DRAWINGS

FIG. 8 is a cross-sectional drawing of the structural embodiment of the invention herein (as viewed from a top perspective).

FIG. 9 is an exploded isometric drawing of another structural embodiment of the invention herein.

FIG. 10 is a cross-sectional drawing of yet another structural embodiment of the invention herein.

DETAILED DESCRIPTION OF THE INVENTION

Figure 1:
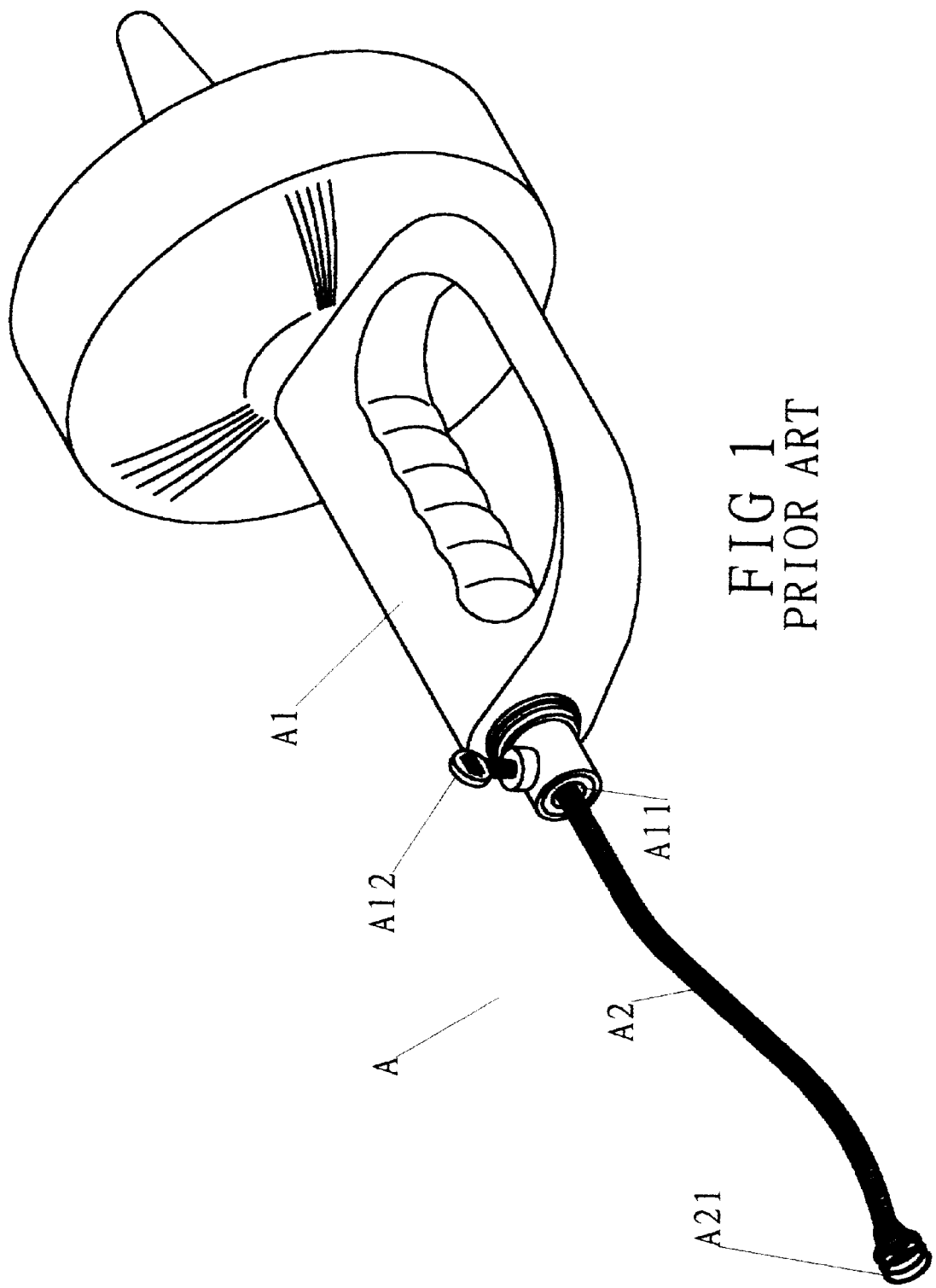
FIG. 1 is an isometric drawing of the conventional structure.
Figure 2:
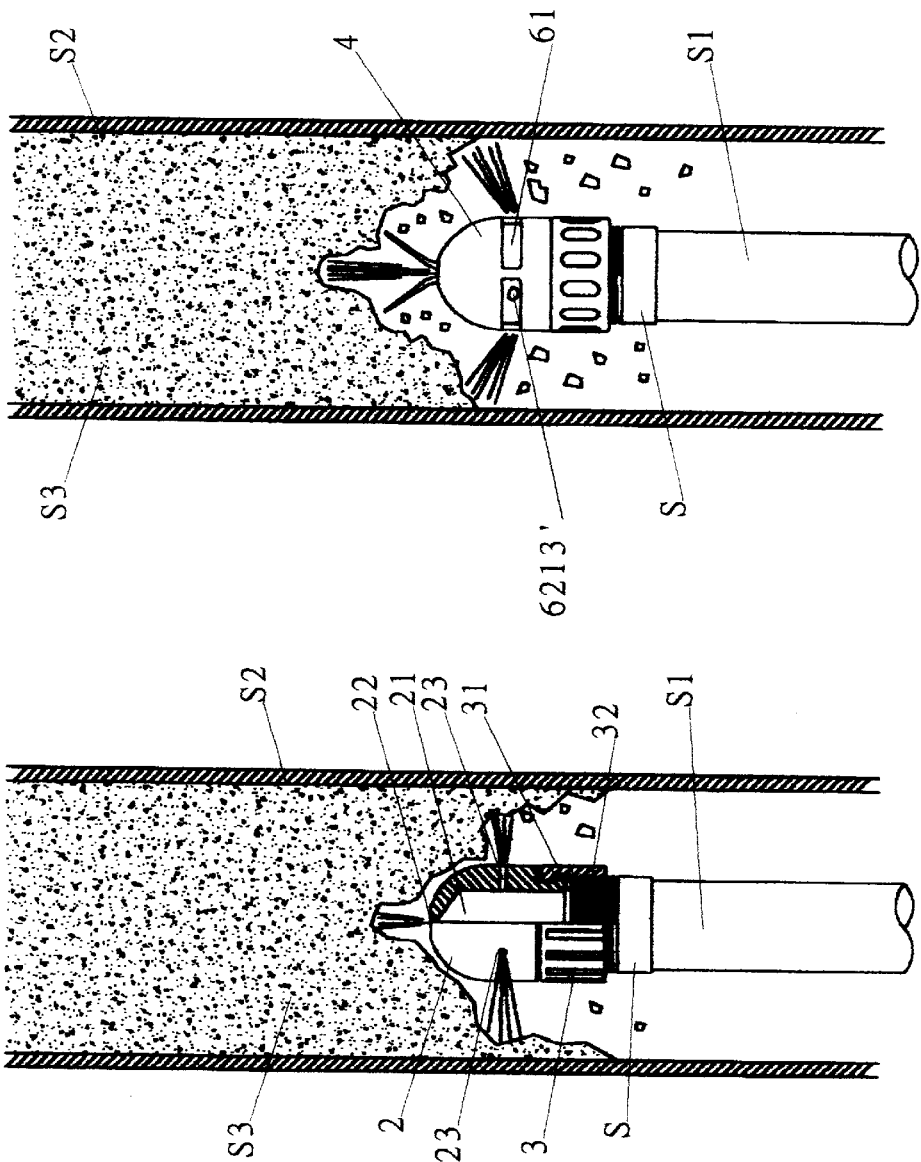
FIG. 2 is a cross-sectional drawing illustrating the operation of another conventional structure.
Figure 3:
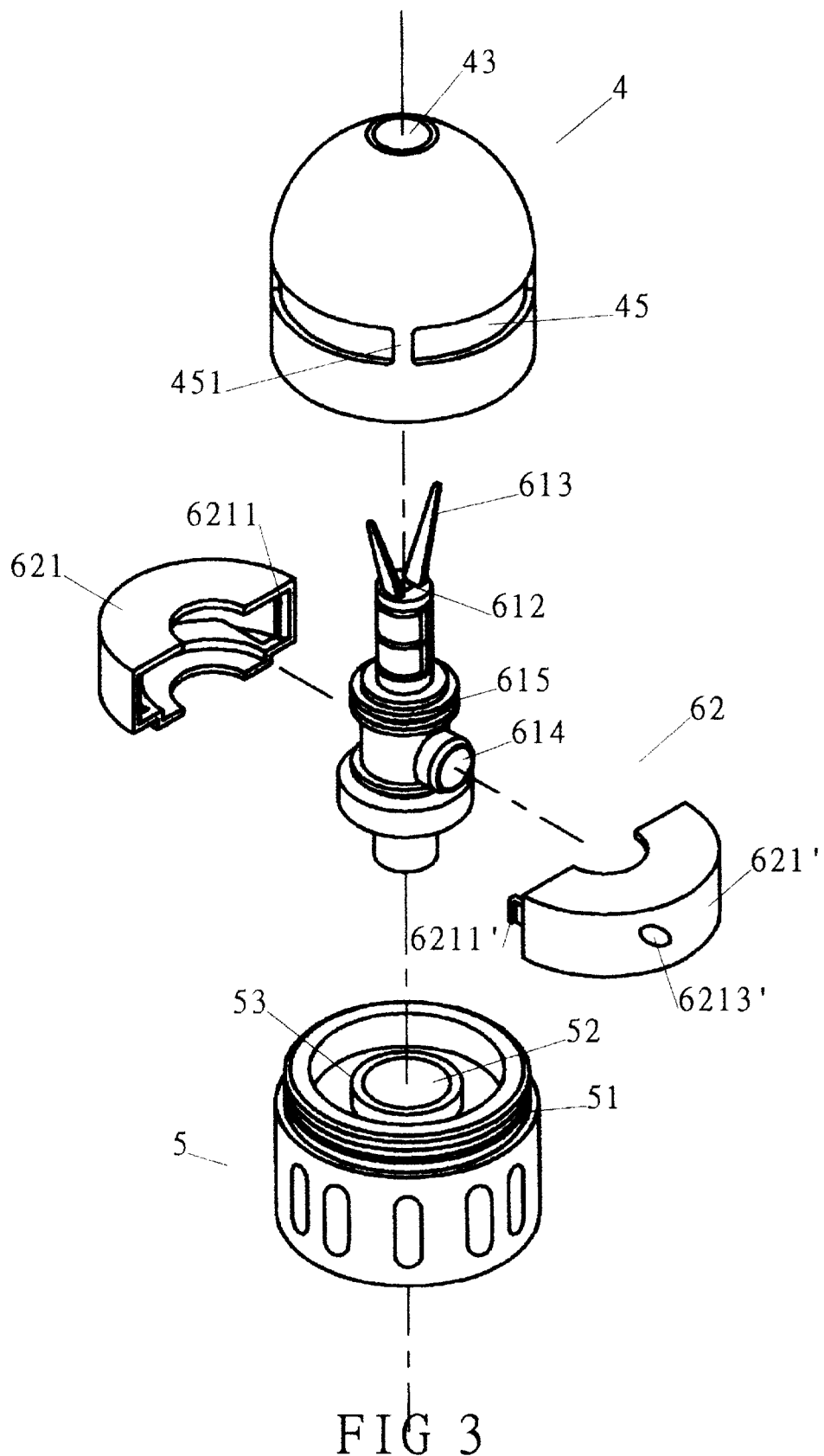
FIG. 3 is an exploded isometric drawing of the invention herein.
Figure 4:
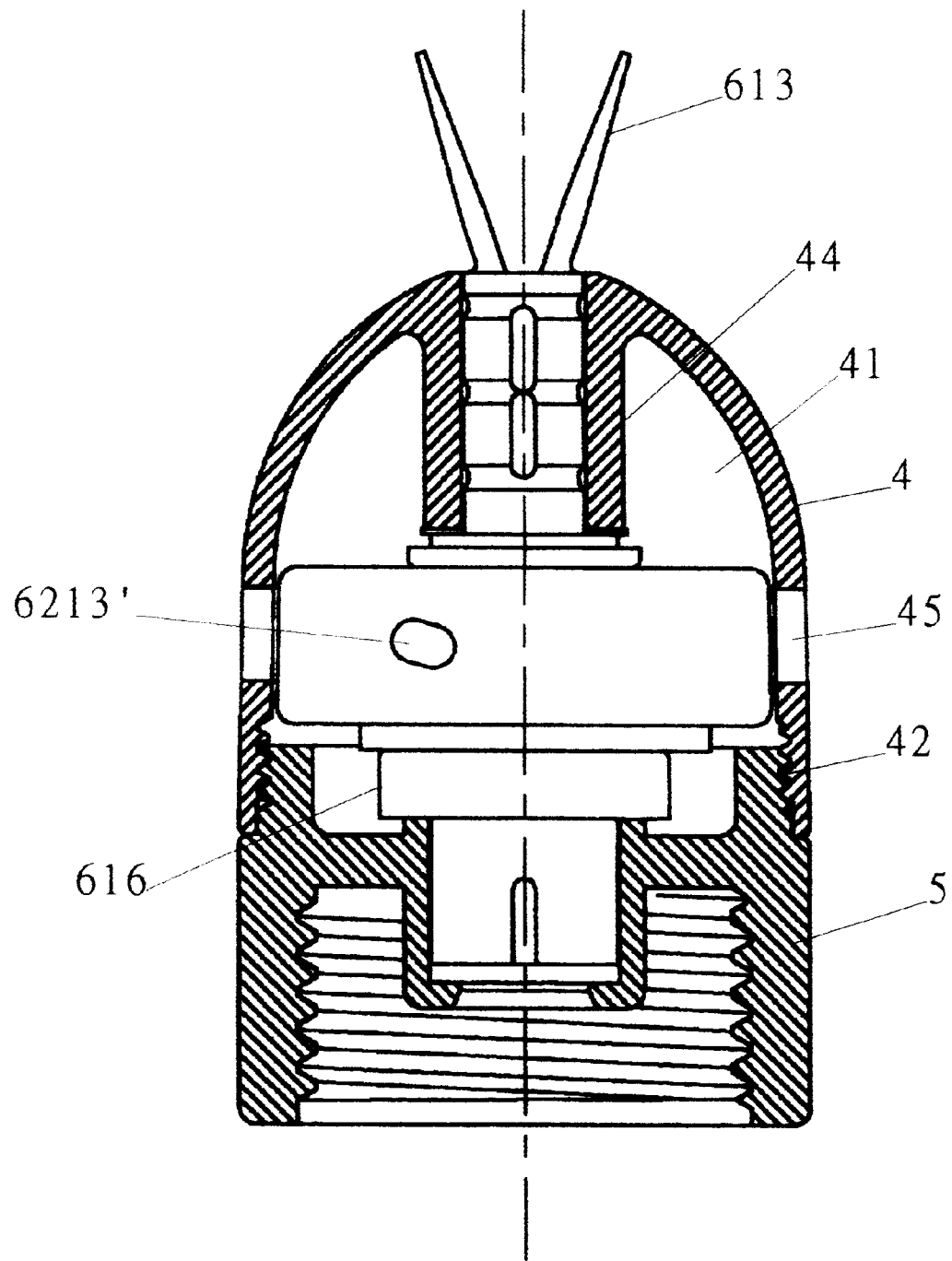
FIG. 4 is a cross-sectional drawing of the of structure of the invention herein.
Figure 7:
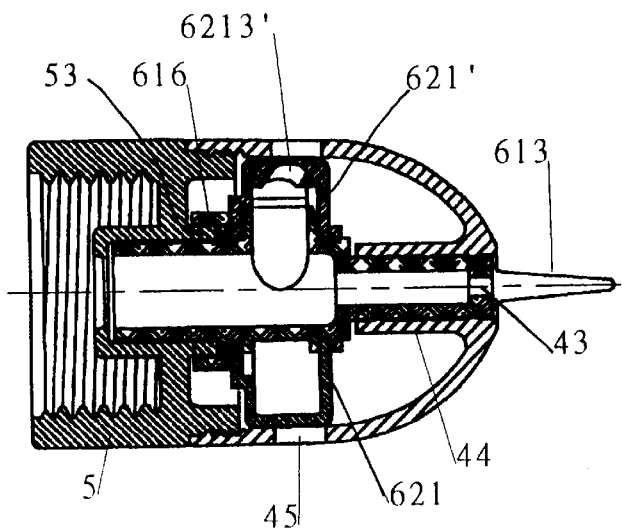
FIG. 7 is a cross-sectional drawing of the structure of the invention herein (as viewed from the perspective of line B—B).

Referring to FIG. 3 and FIG. 4, the water pipeline obstruction remover of the invention herein is comprised of an interior space 41 having internal threads 42 at the lower section, a water output hole 43 of a water output head 4 at the center of the front end, the external threads 51 of the water hose S connection at the bottom section, and the connector seat 5 to which it is conjoined by means of the internal threads 42 at the bottom section of the connector seat 5, and the major innovations of the present invention are: an interior sleeve 44 extends through the front end and the center of the water output head 4 to the water output hole 43, a number of water output openings 45 are situated along the approximate middle section, and there is a water passage 52 at the center interior section of the connector seat 5, with an annular edge 53 at the water output area of the water passage 52 and, finally, contained within the area between the water output head 4 and the connector seat 5 is the water output nozzle 61 and the water output seat 62 comprising the rotary water output head 6; a water output passage 611 is situated along the interior of the water output nozzle 61, the front end of which is connected to the sleeve 48 extending through the front end and center of the water output head 4 to the water output hole 43, with a water output hole 612 situated at the center of the front section, thereby enabling the supplied water to flow and be discharged from the said center, the rotary cleaner arms 613 are positioned at the top section, with a water output passage 614 situated at the middle section and, furthermore, there is a protruding edge 615 at the upper and lower edges of the said water output passage 614, and its bottom section is near the sleeve 616 of the water input opening area, thereby enabling conjoinment to the annular edge 53 at the water output area of the water passage 52 in the connector seat 5; the water output seat 62 consists of the two semicircular seat halves 621 and 621', with said two halves insertion fastened together by means of the protruding edge 6211 fabricated in the interior section of the semicircular seat half 621 and the hook tab 6211' fabricated in the interior section of the other semicircular seat half 621' and, furthermore, are assembled to the water output nozzle 61 into a single physical entity by means of the protruding edge 615 situated on the top and bottom extent of the middle section of the water output nozzle 61, wherein the semicircular seat half 621' is aligned with the water output passage 614 situated at the middle section of the water output nozzle 61 with the insertion fastening edge 6212' facing inward, enabling the placement of the water output hole 6213' along the tangent of the said insertion fastening edge 6212' in the interior section in the direction of the outer circumference of the semicircular seat half 621' and, furthermore, enabling the said water output hole 6213' to be aligned with the water output openings 45 along the middle section of the water output head 4.

Figure 5:
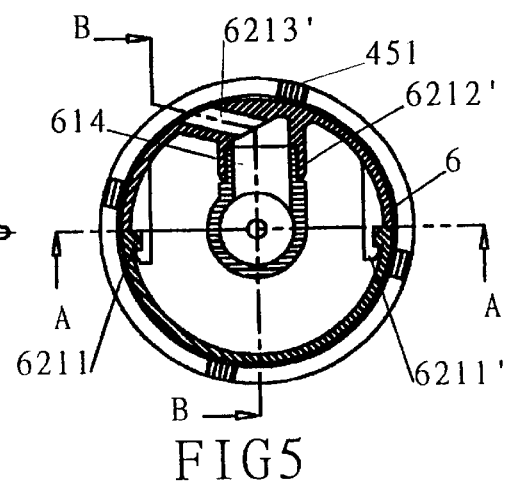
FIG. 5 is a cross-sectional drawing of the of structure of the invention herein (as viewed from a top perspective).
Figure 6:
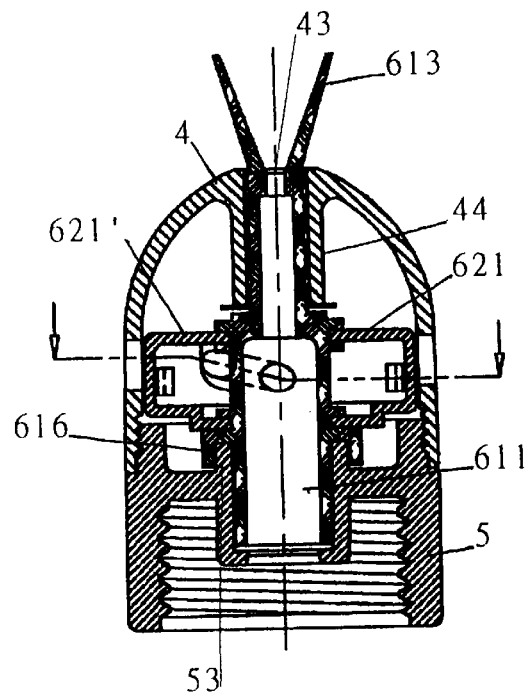
FIG. 6 is a cross-sectional drawing of the structure of the invention herein (as viewed from the perspective of line A—A).

Based on the said structural constituents described thus far and referring to FIG. 5, FIG. 6, FIG. 7, and FIG. 8, when water flows into the water output passage 611 inside the rotary water output head 61 of the obstruction remover, the water passes through the water output passage 614 along the middle section and finally discharges through the water output seat 62, in addition to discharging through the water output hole 6213' of the water output seat 62 at an increased pressure because it is of a smaller diameter than the water output passage 611 inside the rotary water head 61, due to the design of the directional tangent along the inside of the semicircular seat half 621 of the water output seat 62 (as indicated in FIG. 4, FIG. 5, and FIG. 6), as the entire water flow is discharged through the water output hole 6213' of the water output seat 62, in addition to passing through the water output hole 6213' of the water output seat 62 which are of a smaller diameter than the water output passage 11 inside the rotary water output head 61 and thereby causing the intensification of water flow pressure at the said area, due to the design of the directional tangent along the inside of the semicircular seat half 621 of the water output seat 62, when the overall water flow is discharged through the water output hole 6213' of the water output seat 62, since the water output hole 6213' is smaller in diameter than the water output passage 614 in the middle section of the rotary water output head 61, a powerful liquid pressure is generated to power the rotation of the rotary water output head 61 and, furthermore, causes the water flowing through the said water output hole 6213' to discharge tangentially in a forceful swirl and spray out through water output openings 45 along the middle section of the water output head 4 and, to further emphasize, when the water flow is forcefully discharged tangentially through the water output openings 45 around the middle section of the water output head 4 and the flowing water impacts the ribs 451 between each of the water output openings 45, the instantaneous momentum produced causes a rotational force to be generated inside the rotary water output head 6 of the obstruction remover, with the said instantaneous momentum also producing a vibrational force, which are finally combined to spin and bring into guidance operation the rotary cleaner arms 613 at the tip of the front section of the rotary water output head 6, which causes the break up of the foreign matter S3 on the water pipe walls S2 and thereby effectively increases removal performance.

Furthermore, referring to FIG. 9, the rotary water output head 6 is contained in the is the space between the water output head 4 and the connector seat 5 and, in addition to having a water output passage 614 in the middle section of the water output nozzle 61, the original water output seat 62 can be modified so that the bottom end 71 of the water tube 7 can be inserted onto and connected to the said water output passage 614 and thereby direct the tangential flow of water out through the water output hole 72 along the top and bottom inside the water output head 4 and, furthermore, provide a flow of water to the water output passage 611 in the rotary water output head 6 of the obstruction remover that passes through the water output passage 614 along the middle section, such that when the water is finally discharged through the water tube 7, the entire structure similarly achieves increased removal performance.

Furthermore, referring to FIG. 10, the original water output openings 45 situated along the approximate middle section of the water output head 4 can be modified, whereby a number of water output openings are situated along the top section of the connector seat 5 and similarly, the space between the water output head 4 and the connector seat 5 can contain a water output nozzle 61 and a water output seat 62 comprising the rotary water output head 6 to similarly achieve the union of the entire structure with the water pipeline to provide effective removal performance when foreign matter is to be eliminated from the inside of the pipeline.

In summation of the foregoing section, since the invention herein possesses enhanced simplicity and effectiveness that is superior to those of conventional structures such that when the entire structure of the invention herein is in union with the water pipeline for the removal of foreign matter inside the pipeline, the invention herein achieves effective removal performance and thereby complies with new patent application requirements, the invention herein is hereby submitted to the patent bureau for review and the granting of the commensurate patent rights.

What is claimed is:

1. A water pipeline foreign matter obstruction remover that is comprised of an interior space having internal threads at the lower section, a water output hole of a water output head at the center of front end, the external threads of the water hose connector at the bottom section, and the connector seat to which it is conjoined by means of the said internal threads at the bottom section of the said connector seat, and the major innovations of the present invention are: an interior sleeve extends through the front end and center of the said water output head to the water output hole, a number of water output openings are situated along the approximate middle section, and there is a water passage at the center interior section of the said connector seat, with an annular edge at the water output area of the said water passage and, finally, contained within the area between the said water output head and the said connector seat is the water output nozzle and the water output seat comprising the rotary water output head; a water output passage is situated along the interior of the said water output nozzle, the front end of which is connected to the sleeve extending through the front end and center of the said water output head to the said water output hole, with a water output hole situated at the center of the front section, thereby enabling the supplied water to flow and be discharged from the said center, the rotary cleaner arms are positioned at the top section, with a water output passage situated at the middle section and, furthermore, there is a protruding edge at the upper and lower edges of the said water output passage, and its bottom section is near the sleeve of the water input opening area, thereby enabling conjoinment to the said annular edge at the water output area of the said water passage in the said connector seat; the said water output seat consists of two semicircular seat halves, with the said two halves insertion fastened together by means of the protruding edge fabricated in the interior section of one of the said semicircular seat half and the hook tab fabricated in the interior section of the other said semicircular seat half and, furthermore, are assembled to the said water output nozzle into a single physical entity by means of the protruding edge situated on the top and bottom extent of the middle section of the said water output nozzle, wherein one of the said semicircular seat half is aligned with the said water output passage situated at the middle section of the said water output nozzle with the insertion fastening edge facing inward, enabling the placement of the water output hole along the tangent of the said insertion fastening edge in the interior section towards the outer circumference of the said semicircular seat half and, furthermore, enabling the said water output hole to be aligned with the said water output openings along the middle section of the said water output head, which enables the said structural constituents to provide for the union of the entire structure with the pipeline for the elimination of foreign matter inside the pipeline and thereby achieve effective removal performance.

2. As mentioned in claim 1 of the water pipeline foreign matter obstruction remover invention herein, the said rotary water output head is contained in the space between the said water output head and the said connector seat and, in addition to having the said water output passage in the middle section of the said water output nozzle, the original said water output seat can be modified so that the bottom end of water tube can be inserted onto and connected to the said water output passage and thereby direct the tangential flow of water out through a water output hole along the top and bottom inside the said water output head and, furthermore, provide a flow of water to the said water output passage in the said rotary water output head of the obstruction remover that passes through the said water output passage along the middle section, such that when the water is finally discharged through the said water tube, the entire structure similarly achieves increased removal performance, which is a key innovation of the invention herein.

3. As mentioned in claim 1 of the water pipeline foreign matter obstruction remover invention herein, the original said water output openings situated along the approximate middle section of the said water output head can be modified, whereby a number of the said water output openings are situated along the top section of the said connector seat and similarly, the space between the said water output head and the said connector seat can contain the said water output nozzle and the said water output seat comprising the said rotary water output had to similarly achieve the union of the entire structure with the water pipeline to provide effective removal, which is a another key innovation of the invention herein.

* * * * *